March 4, 1952

L. J. LIBOIS 2,587,741

PULSE SHAPING CIRCUIT

Filed Dec. 28, 1948

Inventor
Louis J. Libois
By Haseltine, Lake & Co.
Agents

Patented Mar. 4, 1952 2,587,741

UNITED STATES PATENT OFFICE 2,587,741

PULSE SHAPING CIRCUIT

Louis-Joseph Libois, Paris, France

Application December 28, 1948, Serial No. 67,744
In France February 9, 1948

2 Claims. (Cl. 250—27)

It is known, particularly in multiplex pulse transmission systems, to supply to the input of a line, which may be a delay or artificial line, a pulse shaped signal, which may or may not be periodical, and to collect the signal at one or more points of the line, thus providing a pulse distributor.

In many known applications of this principle, the distortions caused in these pulses, chiefly by the attenuation and phase shift characteristics which vary with the line frequency used, do not allow the pulses to be used in their initial shape and require the provision, at each distribution point, of more or less complex clipping circuits which must, eventually, be capable of individual adjustment.

It is an object of the invention to obviate these drawbacks, in most cases, by supplying to the line a pulse signal of a particular shape, with a comparatively narrow frequency spectrum, much less liable to distortion in its propagation along the line.

Accordingly the invention will permit the direct use of the pulses distributed along the line in cases where their distortion and their amplitude variation may be neglected, the latter being avoided by the use of lines with an exponentially increasing impedance as is well known in the art. The invention will also permit using them after passing through clipping circuits, which are less complex, less delicate and easier to adjust than is the case with conventional methods.

A further object of the present invention is to provide a method of coupling a source of pulses to these electrical transmission lines characterized in that the initial signal, of a predetermined polarity, is converted into a signal comprising one or more oscillations of each polarity by superimposing thereon a second signal, derived from the initial signal and introduced at a suitable point of the line.

Another object of the present invention is to provide a coupling circuit for carrying out the foregoing method characterized in that the signal to be transmitted is applied to one of the electrodes, cathode or anode, of an electron tube, or applied, through the other electrode of the tube, at a point of the line such that the delay incurred by the signal applied at this point is equal to the duration of said signal.

Other features and particular advantages of the invention will be apparent from the ensuing description when read in conjunction with the appended drawings, wherein.

Figure 1:
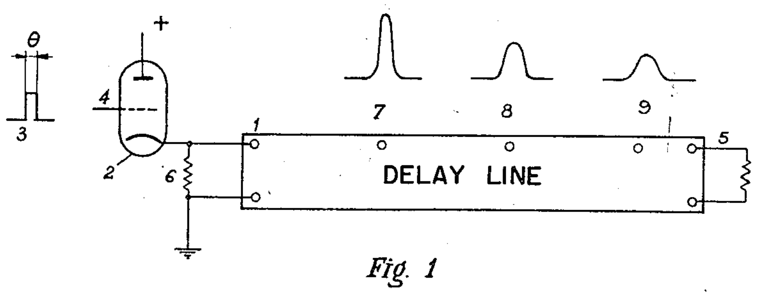
Figure 1 shows a conventional circuit as known in the art for connection to a delay line, and supplying positive pulses.

In circuits of the type shown in Figure 1, the input 1 to the line is connected to the cathode of tube 2, the pulse 3 being applied to the grid 4 either between the grid and earth or between the grid and cathode.

The line is terminated at 5 on its characteristic impedance to avoid the reflection of signals at that point. A resistor 6, equal in value to the characteristic impedance, is added at the input to the line; between two pulses, the tube is normally inoperative and consequently offers an infinite impedance at its cathode terminals; the resistor 6 avoids reflections at the input to the line.

Figure 2:
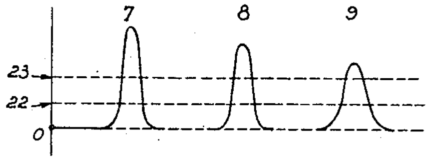
Figure 2 is a diagram of the signals obtained with the circuit of Figure 1.

The signals may be collected at any intermediate points such as 7, 8 and 9 and their shapes will be such as those shown opposite these points on the diagram of Figure 2. The gradual lengthening of the pulse, together with its amplitude loss, corresponds to an attenuation characteristic rising sharply with an increasing frequency, as commonly obtained in practice, and this effect may be very troublesome for the use contemplated.

Figure 3:
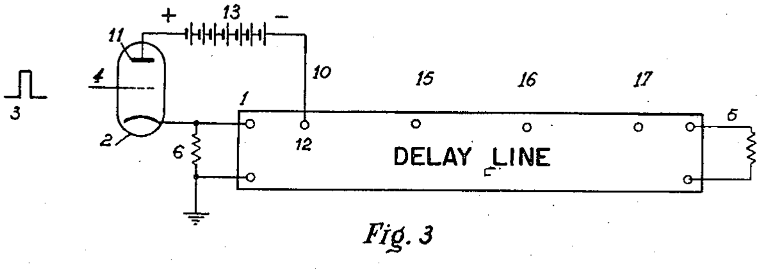
Figure 3 is a view similar to Fig. 1 of a first embodiment of a circuit according to the invention.

Figure 3 shows an example of a coupling circuit according to the invention, the modification with respect to the conventional circuit of Figure 1 consisting in the addition of the link 10, connecting the plate 11 of tube 2 to a point 12 of the line, through an anode battery 13. The location of point 12 on the line is so selected that the transmission delay from point 1 is equal to the duration $\theta$ of the rectangular signal 3 applied at the input to the tube, on the grid 4 of the latter.

Figure 4:
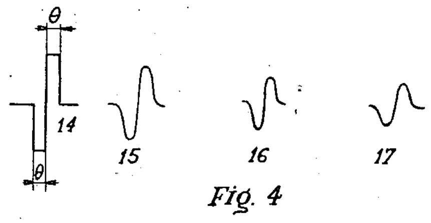
Figure 4 is a diagram of signals obtained with the circuit of Figure 3.

The signal at this point 12 will then have, if the distortions due to the line are ignored, the shape shown at 14 in Figure 4, comprising a positive signal of a duration $\theta$ preceded by a negative signal of the same duration and amplitude. The signals collected at points 15, 16 and 17 corresponding respectively to points 7, 8 and 9 of Figure 1 will then have the new shapes shown in Figure 4, where the signal markings correspond respectively to points 16, 16 and 17 considered.

A preferred modification to this circuit consists in omitting the resistor 6 so as to allow the reflection of oscillations at the input to the line.

Figure 6:
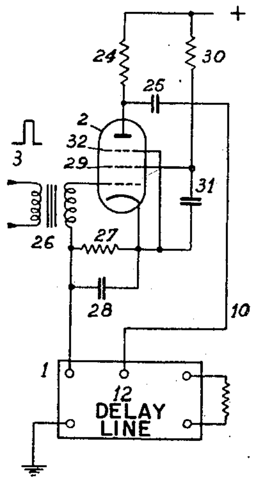
Figure 6 shows another embodiment of a circuit incorporating the characteristics of the invention.
Figure 5:
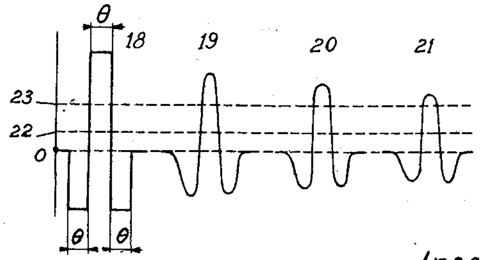
Figure 5 is a diagram of signals obtained with a modification of the circuit of Figure 3

The operation in this case will be better understood by reference to the diagram of Figure 5 and to the schematic of Figure 6.

In the schematic of Figure 6, the pulse is applied, in its initial shape, to the control grid of the electron tube 2. Letting I be the current flowing through tube 2 during the duration $\theta$ of the pulse 3 applied to the control grid, there will appear, at point 1 of the delay line, a pulse of a positive polarity and with an amplitude ZI, Z being the characteristic impedance of the delay line. At the same time, the current I causes the production at point 12 of a pulse having a negative polarity and an amplitule $$\frac{Z}{2}I$$

since the impedance, as seen from point 12, is equal to one half of the characteristic impedance of the line. $\theta$ being the transmission time of the line between 1 and 12. The resulting pulse will thus consist of the sum of the three following pulses:

(a) A pulse having a negative polarity (duration $\theta$);

(b) A positive pulse with a double amplitude and delayed by $\theta$ with respect to the preceding negative pulse;

(c) A second negative pulse arising from the reflection of pulse (a) at point 1 of the line and delayed by $2\theta$ with respect to pulse (a).

Consequently, the signal corresponding to 14 will have the shape shown at 18 on the diagram of Figure 5, comprising a first negative signal of a duration $\theta$, a positive signal of the same duration but of a double amplitude and finally a second negative signal identical with the first one. The signals then collected along the line at points 15—16 and 17 will have, respectively, the shapes shown at 19, 20, and 21 of the same figure.

If these signals are used, for instance, to effect the release of multiplex signals at the reception (pulse modulation), we may consider two voltages represented by the horizontal lines 22 and 23 on Figures 2 and 3, corresponding, respectively to the threshold of the release action (voltage 22) and to the limit of effective action (voltage 23).

It will be seen that the width of the signals inside these two limits remains practically constant and close to $\theta$, which is not the case for the corresponding signals 7, 8 and 9 reproduced on the diagrams of Figure 4.

The mathematical explanation of the effect obtained by means of the invention may be derived from an examination of the frequency spectra of the various pulses considered.

The pulses shown at 3 in Figures 1 and 3, 14 in Figure 4 and 18 in Figure 5, have spectra which are characterized respectively by the three following functions:

$$\frac{\sin \pi f\theta}{\pi f\theta}$$

$$\frac{2 \sin^2 \pi f\theta}{\pi f\theta}$$

$$\frac{2 \sin^3 \pi f\theta}{\pi f\theta}$$

The third function, for instance, corresponds to a spectrum in which the low frequency components are very much attenuated, and the spectrum is so to speak more and more concentrated around certain frequencies. The spectrum could be further simplified by complicating a little more the shape of the pulse, but the bulk of the pulse then increases and the putting into practice is less simple.

It is quite obvious that the details of the diagram given in Figure 3 do not in any way restrict the means which can be used in carrying out the invention; Figure 6 shows for instance a type of practical embodiment of the means described. The tube 2 shown in that figure is a pentode; the high value of the internal resistance of its anode, as well as the choice of a resistor 24 having a sufficiently high value make it possible not to disturb the impedance uniformity of the line by the connection at point 12 obtained by means of capacitor 25. The pulse 3 is applied by means of the transformer 26 between the grid and cathode of the tube 2 through the biassing circuit consisting of the resistor 27 and the capacitor 28. In this Figure 6, as in Figure 1, the source of D. C. voltage is not shown otherwise than by its positive terminal. Its negative terminal is supposed to be earthed. The screen grid 29 of the tube is supplied through the resistor 30 and bypassed by the capacitor 31.

The suppressor grid 32 is connected directly to the cathode.

This circuit makes it possible to supply the line with a signal having a positive portion of the same amplitude as in the case of circuits known heretofore and supplies the additional negative signals without requiring the use of any other tube, merely by the arrangement of the additional connection 10.

Although the present invention has been shown and described in detail in connection with two particular examples of embodiment, it is quite obvious that it is not limited to said examples and that it is capable of numerous variants and modifications within the scope of the invention.

In particular, for instance, in the case of Figure 6, it is possible to interchange the functions of the anode and cathode; in such a case, instead of having, as in Figure 5, a positive signal consisting of a positive portion interposed between two negative portions, it is possible to have a signal of opposite polarity consisting of a negative portion between two positive portions. This latter signal would, however, be less interesting from a practical point of view.

What is claimed is:

1. In an electronic device for time division multiplex communication systems, a pulse shaping circuit for transforming a single pulse signal of predetermined polarity into a complex signal comprising a plurality of pulses of different polarities, said circuit comprising an electronic tube with at least a cathode, a control grid and an anode, means for applying to said control grid the single pulse signal of predetermined polarity, a delay line with a delay at least equal to the duration of said single pulse, means for connecting the cathode of said electronic tube to one end of said delay line, means for connecting the anode of the tube to a point of said delay line so chosen that the delay between said end and said point be approximately equal to the duration of above-said single pulse, a resistance of value substantially equal to the characteristic impedance and connected to the other end of said delay line, and means for applying voltages from a plurality of tappings along said delay line to a working circuit.

2. A device as in claim 1, wherein a further resistance is provided for terminating the delay line on its characteristic impedance at the end of said delay line connected to the cathode of the tube.

LOUIS-JOSEPH LIBOIS.

REFERENCES CITED

The following references are of record in the file of this patent:

UNITED STATES PATENTS

| Number | Name | Date |
|---|---|---|
| 2,437,313 | Bedford | Mar. 9, 1948 |
| 2,449,819 | Purington | Sept. 21, 1948 |
| 2,465,840 | Blumlien | Mar. 29, 1949 |
| 2,474,243 | Greenwald | June 28, 1949 |